United States Patent
Aly et al.

(10) Patent No.: US 10,768,946 B2
(45) Date of Patent: Sep. 8, 2020

(54) EDGE CONFIGURATION OF SOFTWARE SYSTEMS FOR MANUFACTURING

(71) Applicant: SAP SE, Walldorf (DE)

(72) Inventors: Mohamed Aly, Mannheim (DE);
Matthias Lehr, Weinheim (DE);
Abdelrahman Elmeniawy, Mannheim (DE)

(73) Assignee: SAP SE, Walldorf (DE)

( * ) Notice: Subject to any disclaimer, the term of this patent is extended or adjusted under 35 U.S.C. 154(b) by 80 days.

(21) Appl. No.: 16/161,007

(22) Filed: Oct. 15, 2018

(65) Prior Publication Data

US 2020/0117477 A1    Apr. 16, 2020

(51) Int. Cl.
*G06F 9/44* (2018.01)
*G06F 9/445* (2018.01)
*G06F 8/65* (2018.01)
*G06F 8/61* (2018.01)

(52) U.S. Cl.
CPC ............ *G06F 9/44505* (2013.01); *G06F 8/61* (2013.01); *G06F 8/65* (2013.01)

(58) Field of Classification Search
None
See application file for complete search history.

(56) References Cited

U.S. PATENT DOCUMENTS

| | | |
|---|---|---|
| 7,970,830 B2 | 6/2011 | Staggs et al. |
| 8,175,733 B2 | 5/2012 | Rothenburg |
| 9,741,015 B2 | 8/2017 | Kohlhoff |
| 2010/0042376 A1 | 2/2010 | Weatherhead |
| 2012/0166786 A1* | 6/2012 | Selitser ............... G06F 8/70 713/2 |
| 2013/0297055 A1 | 11/2013 | Wang |

(Continued)

OTHER PUBLICATIONS

A. Bergmayr, M. Wimmer, G. Kappel and M. Grossniklaus, "Cloud Modeling Languages by Example," IEEE 7th International Conference on Service-Oriented Computing and Applications, pp. 137-146, 2014.

(Continued)

*Primary Examiner* — Danny Chan
(74) *Attorney, Agent, or Firm* — Fountainhead Law Group P.C.

(57) ABSTRACT

In one embodiment, a method receiving a specification of a manufacturing system that is generated using a modeling language. The modeling language allows a layout of machines to be specified. Available software systems from a software provider are retrieved and the specification is analyzed to determine applicable software systems for the manufacturing system. The method generates a configuration based on the analysis of the layout of the machines for the manufacturing system. The configuration specifies instances of software systems to be installed on the machines and an edge system between the manufacturing system and a remote computing environment. The instances of the software systems are deployed on the edge system and the machines and the edge system orchestrates operations on the machines operating in the manufacturing system in real-time. Also, the edge system communicates with the remote computing environment for non-real time operations on the set of machines.

20 Claims, 8 Drawing Sheets

(56) References Cited

U.S. PATENT DOCUMENTS

| | | | | |
|---|---|---|---|---|
| 2015/0381550 | A1* | 12/2015 | Mohammed | H04L 63/101 709/206 |
| 2017/0146986 | A1* | 5/2017 | Libal | G05B 19/0426 |
| 2017/0357249 | A1 | 12/2017 | Sandler et al. | |
| 2018/0165122 | A1* | 6/2018 | Dobrev | G06F 8/60 |
| 2018/0239322 | A1* | 8/2018 | Matsuo | G06Q 50/163 |
| 2018/0337820 | A1* | 11/2018 | Chen | H04W 4/08 |
| 2019/0026135 | A1* | 1/2019 | Chen | G06F 9/455 |
| 2019/0361683 | A1* | 11/2019 | Bruderek | G06F 8/63 |
| 2020/0014607 | A1* | 1/2020 | Gangadhar | H04L 41/5054 |

OTHER PUBLICATIONS

A. Bergmayr, U. Breitenbücher, N. Ferry, A. Rossini, A. Solberg, M. Wimmer, G. Kappel and F. Leymann, "A Systematic Review of Cloud Modeling Languages," ACM Computing Surveys, 2018.

L. Hermerschmidt, A. Perez and B. Rumpe, "A Model-based Software Development Kit for the SensorCloud Platform," In Trusted Cloud Computing, Helmut Krcmar, Ralf Reussner, and Bernhard Rumpe (Eds.), pp. 125-140, 2014.

C. Pahl, "Containers and Clusters for Edge Cloud Architectures—a Technology Review," Irish Centre for Cloud Computing and Commerce IC4 & Lero, the Irish Software Research Centre, p. 8 pages, 2014.

M. Heusser, "30-essential-container-technology-tools-resources," Jun. 11, 2018. [Online]. Available: https://techbeacon.com/30-essential-container-technology-tools-resources.

Dinh Koha Nguyen et al., "Blueprint Template Support for Engineering Cloud-Based Services", ServiceWave 2011 Conference, Oct. 26-28, 2011, Poznan, Poland, pp. 26-37.

A. Bergmayr, J. Troya, P. Neubauer, M. Wimmer and G. Kappel, "UML-based Culoud Application Modeling with Libraries, Profiles and Templates," In Proc. Workshop CloudMDE, pp. 56-65, 2014.

S. Frey and W. Hasselbring, "The CloudMIG Approach: Model-Based Migration of Software Systems to Cloud-Optimized Applications," IntL J. Advances in Software, vol. 4, No. 4, pp. 342-353, 2011.

Lana, "omg.com," OMG, May 27, 2015. [Online]. Available: https://www.omg.org/technology/kdm/. [Accessed Jun. 11, 2018].

N. Ferry, A. Rossini, P. Chauvel, B. Morin and A. Solberg, "Towards Model-Driven Provisioning, Deployment, Monitoring, and Adaptation of Multi-Cloud Systems," In Proc. Conf. on Cloud Computing (CWUD), pp. 887-894, 2013.

E. Brandzreg, P. Mohagheghi and S. Mosser, "Towards a Domain Specific Language to Deploy Applications in the Cloud," In Proc. Conj on Cloud Computing, GRJDs, and Visualization (CWUD COMPUTING), pp. 213-218, 2012.

G. Goncalves, P. Endo, M. Santos, D. Sadok, J. Kelner, B. Merlander and J.-E. Miings, "CloudML: An Integrated Language for Resource, Service and Request Description for D-Clouds," In Proc. Conf on Cloud Computing Technologies and Science (CloudCom), pp. 399-406, 2011.

F. Leymann, C. Fehling, R. Mietzner, A. Nowak and S. Dustdar, "Moving Applications to the Cloud: An Approach Based on Application Model Enrichment," Int. J Cooperative Inf. System, vol. 20, No. 3, pp. 307-356, 2011.

I. Guillen, J. Miranda, J. M. Murillo and C. Canal, "A UML Profile for Modeling Multicloud Applications," In Proc. Europ. Conf. Service-Oriented and Cloud Computing (ESOCC), Sep. 11-13, 2013, pp. 18-187, 2013.

C. Chapman, W. Emmerich, F. G. Marquez, S. Oayman and A. Gattis, "Software Architecture Definition for On-Demand Cloud Provisioning," Cluster Comput., vol. 15, No. 2, pp. 79-100, 2012.

T. Binz, U. Breitenbticher, 0. Kopp and F. Leymann, "TOSCA: Portable Automated Deployment and Management of Cloud Applications," in Advanced Web Services, Springer, 2014.

A. N. Pérez and B. Rumpe, "Modeling Cloud Architectures as Interactive Systems," In Proc. of Intl. Workshop on Model-Driven Engineering for High Performance and CLoud computing (MDHPCL), pp. 15-24, 2013.

V. Andrikopoulos, A. Reuter, M. Xiu and F. Leymann, "Design Support for Cost-Efficient Application Distribution in the Cloud," In Proc. of Intl. Conf. on Cloud Computing (CLOUD), 2014 IEEE International Conference on Cloud Computing, Jun. 27-Jul. 2, 2014, p. 697-704, 2014.

T. Holmes, "Facilitating Agile Prototyping of Cloud Applications A Model-based Approach," In Proceedings of the MoDELS 2015 Demo and Poster Session co-located with ACM/IEEE 18th International Conference on Model Driven Engineering Languages and Systems (MoDELS 2015), pp. 52-55, 2015.

T. Holmes, "Facilitating Migration of Cloud Infrastructure Services: A Model-Based Approach," In Proc. of Intl. Workshop on Model-Driven Engineering on and for the Cloud (CloudMDE), pp. 7-12, 2015.

M. Hamdaqa and L. Tahvildari, "StratusPM: An Analytical Performance Model for Cloud Applications," In 10th IEEE International Symposium on the Maintenance and Evolution of Service-Oriented and Cloud-Based Environments, Oct. 3, 2016, pp. 24-31.

M. Hamdaqa and L. Tahvildari, "StratusML: A Layered Cloud Modeling Framework," In Proc. of Intl. Conf. on Cloud Engineering (IC2E), pp. 96-105, 2015.

N. Ferry, H.Song, A. Rossini, F. Chauvel and A. Solberg, "Cloud MF: Applying MDE to Tame the Complexity of Managing Multi-Cloud Applications," In Proc. of Intl. Conf. on Utility and Cloud Computing (UCC), p. 269-277, 2014.

G. Silva, L. Rose and R. Calinescu, "Cloud DSL: A Language for Supporting Cloud Portability by Describing Cloud Entities," In Proc. of Intl. Workshop on Model-Driven Engineering on and for the Cloud (CloudMDE), p. 36-45, 2014.

"SAP Plant Connectivity," SAP, [Online]. Available: https://www.sap.com/germany/products/manufacturing-automation-plant-connectivity.html. [Accessed Jun. 11, 2018], 8 pages.

"SAP Manufacturing Execution," SAP, [Online]. Available: https://www.sap.com/germany/products/execution-mes.html. [Accessed Jun. 11, 2018], 9 pages.

"SAP HANA," SAP, [Online]. Available: https://www.sap.com/products/hana.html. [Accessed Jun. 11, 2018], 11 pages.

"SAP Manufacturing Intellegince Intergration," SAP, [Online]. Available: https://www.sap.com/germany/products/manufacturing-intelligence-integration.html. [Accessed Jun. 11, 2018], 9 pages.

* cited by examiner

```
Factory f1;
Plant plant1;                              307
f1.addPlant(plant1);
plant1.addProductionHours(start="05:00" end="22:30");

Machine AGV1;
Machine AGV2;
Machine AGV3;
Machine AGV4;
Machine AGV5;
Machine station1;                    } 304
Machine station2;
Machine station3;
Machine controlPod;
Machine PLC1;                              305
Machine PLC2;
PLC2.addSoftwareRequirement(name="PCo" minVersion=3.1 maxVersion=4.8);

plant1.addMachine(AGV1);
plant1.addMachine(AGV2);
plant1.addMachine(AGV3);
plant1.addMachine(AGV4);
plant1.addMachine(AGV5);
plant1.addMachine(station1);         } 306
plant1.addMachine(station2);
plant1.addMachine(station3);
plant1.addMachine(controlPod);
plant1.addMachine(PLC1);
plant1.addMachine(PLC2);

Container k8sPlant1;
k8sPlant1.initializeCluster(plant1);                } 308
k8sPlant1.createImage(name="PCo" replicas=3 port=5000);
    309
                    Specification
                         302
```

FIG. 3A

Container creation
file
310

```
apiVersion: apps/v1
kind: Deployment
metadata:
  name: PCo
  labels:
    app: PCo
spec:
  replicas: 3
  selector:
    matchLabels:
      app: PCo
  template:
    metadata:
      labels:
        app: PCo
    spec:
      containers:
      - name: PCo
        image: PCo
        ports:
        - containerPort: 5000
```

312 — metadata block (name/labels)
314 — spec selector/template block
316 — containers block

FIG. 3C

Cluster initialization file 320-1

```
# install Container
apt-get update
apt-get install -y container.io install Container
apt-get update && apt-get install -y apt-transport-https curl
curl -s https://packages.cloud.company.com/apt/doc/apt-key.gpg | apt-key add -
cat <<EOF >/etc/apt/sources.list.d/container.list
deb http://apt.container.io/ container main
EOF
apt-get update
apt-get install -y containers
```

Cluster initialization file 320-2

```
# initialize master
container init mkdir -p $HOME/.container
sudo cp -i /etc/ container/admin.conf $HOME/.container/config
sudo chown $(id -u):$(id -g) $HOME/.container/config
```

FIG. 3D

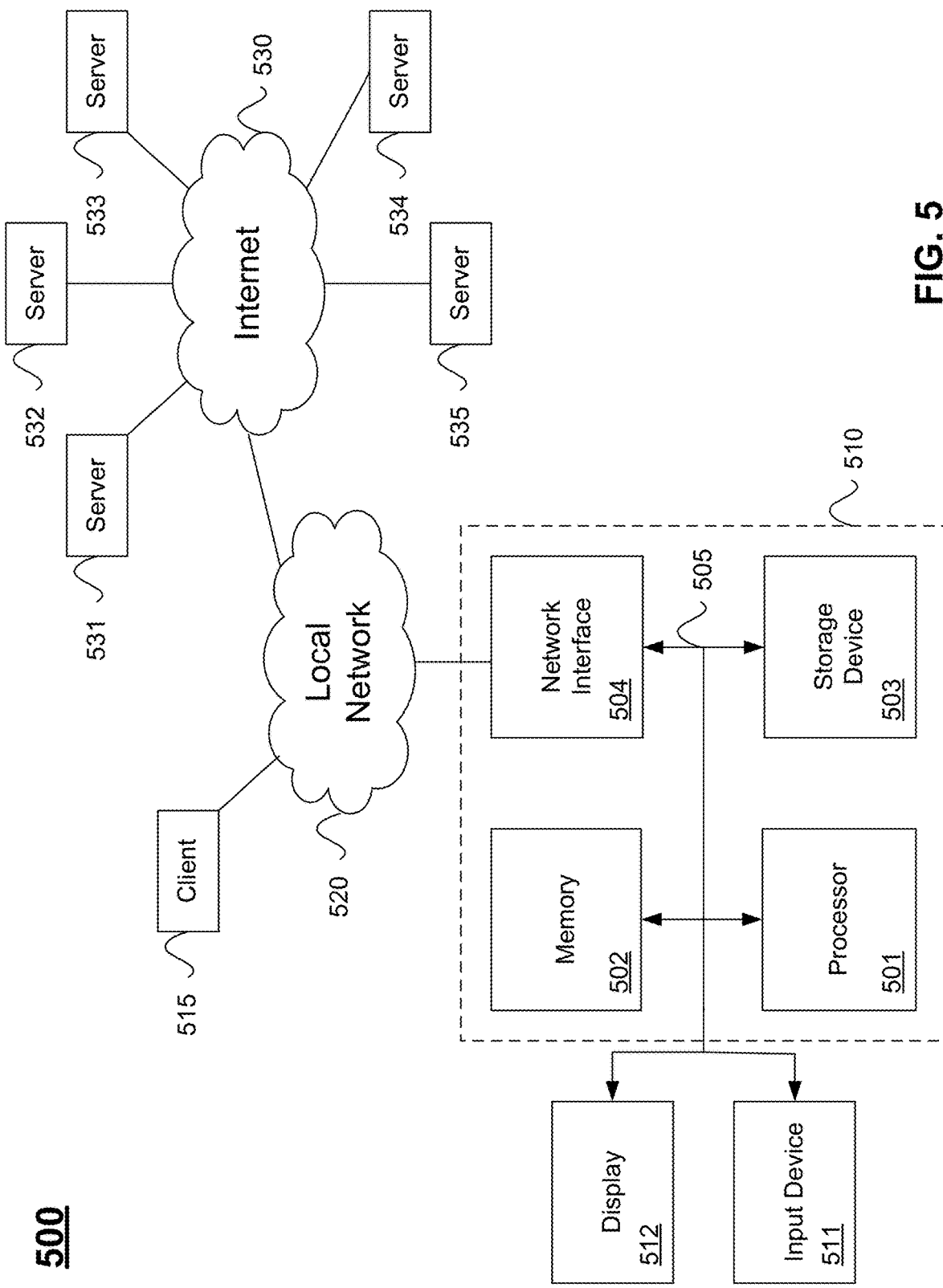

EDGE CONFIGURATION OF SOFTWARE SYSTEMS FOR MANUFACTURING

BACKGROUND

Software as a service (SaaS) solutions allow customers to outsource the management of a computing infrastructure and software that is required to run the business of the company. The SaaS solution may rely on computing devices in a remote location, referred to as the cloud, from the company. However, companies in certain domains, such as the manufacturing domain, may require a stable real-time and highly available computing environment for the manufacturing systems. For example, machines that are operating on a shop floor and performing some operations require a real-time and highly available computing environment. Relying on the SaaS solution may not be a reliable choice due to network stability issues, real-time constraints, etc.

BRIEF DESCRIPTION OF THE DRAWINGS

FIG. 3A depicts an example of a specification for modeling an edge system according to some embodiments.

FIG. 3C depicts an example of container creation files according to some embodiments.

FIG. 3D depicts an example of cluster initialization scripts according to some embodiments.

FIG. 5 illustrates hardware of a special purpose computing machine configured with a server system according to one embodiment.

DETAILED DESCRIPTION

Figure 1:
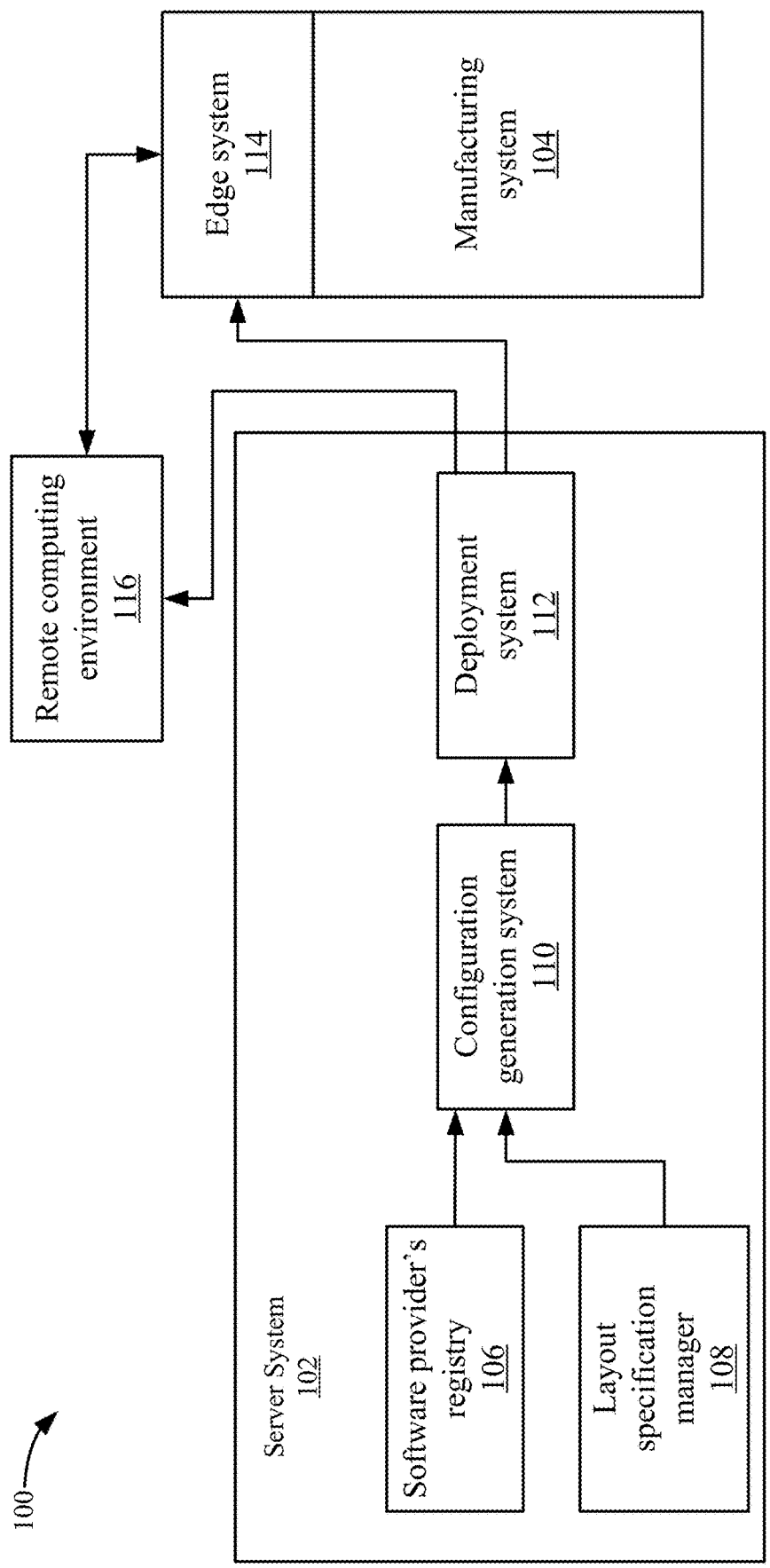
FIG. 1 depicts a simplified system for configuring and managing edge systems according to some embodiments.

Described herein are techniques for modeling an edge computing system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

To overcome the issues of using a pure SaaS environment, some embodiments configure edge components in an edge system at a company's premises to communicate with the manufacturing system in real-time. The edge components also communicate with a remote computing environment that is remote to the manufacturing system, such as computing environment in the cloud. The edge components may orchestrate the real-time operational requirements with the manufacturing system. Additionally, the edge components may communicate with the remote computing environment to perform other operations that do not require real-time responses. For example, the remote computing environment may perform analytical operations to analyze the data stored for the manufacturing systems.

A software provider may manage the software operating on the remote computing environment and may also deliver a software solution to the edge components. However, because the edge components are controlled and specific to each customer, it may be challenging to configure the software for each different manufacturing system. For example, configuring edge components at a customer's premise is different from configuring remote computing systems that may be operated by the software provider. Some embodiments provide techniques for configuring the edge components with software to manage manufacturing systems. Each customer may have different manufacturing systems that have a different layout and different operational requirements. This requires that the software installed at the edge components be delivered with different configurations. For example, a software provider may need to configure the edge software systems based on different types of machines in the manufacturing system and also different production requirements, such as downtime during production.

The process of modeling the manufacturing system may experience many different problems. One problem with modeling the manufacturing system is that the software provider is not familiar with the configuration of the manufacturing system. For example, the customer may understand the layout of the manufacturing system much better than the software provider because the customer has designed and is working with the machines on a daily basis. However, the customer may find it difficult to model the shop floor themselves. A second problem is that the different layouts of manufacturing systems for different customers are diverse and require different deployment specifications. A third problem is the installation of the software provider's software at a location of the manufacturing system. The installation may require a technical team and be manually performed without a deployment system. A fourth problem is the support of different platform types from the software provider. A fifth problem occurs when modeling dependencies between the software used at the manufacturing system. If a software application #1 depends on version 1.1.7 of a software application #2, and software application #2 gets updated without software application #1 supporting the new change, the machines may stop functioning as desired. A sixth problem is modeling the machine software requirements. For example, a machine #1 uses a software version 1.1.7. If the software is updated, the software may no longer be compatible with machine #1 and the machine may stop functioning properly. A seventh problem may be that different customers have different operational requirements, such as constraints on possible downtime during production. Some customers may specify that there may not be any software patches or upgrades during a time period, such as weekdays between certain times. This constrains the software provider from delivering patches and upgrades only on Saturday and Sunday. The customer may not want the patches or upgrades to be delivered because they result in production downtime.

Some embodiments overcome the above problems by providing a modeling language that can be used by a user, such as a user associated with the manufacturer, to model the edge system. The modeling language includes features that may be used to model and configure the manufacturing system. For example, the modeling language allows the user to configure the edge system to interact with the manufacturing system for the customer. The modeling language includes components that correspond to elements of the manufacturing system, such as machines included in the manufacturing system. Then, some embodiments automatically generate a configuration for the edge system. Using the configuration, some embodiments deploy the software system on the edge system and then, once deployed, the edge system can orchestrate the operation of the manufacturing system.

In some embodiments, a user uses the modeling language to describe the layout of the manufacturing system. The customer may have a more in depth knowledge of the layout of the manufacturing system. The layout may specify the machines included in the manufacturing system and types of software being executed on the machines. Then, some embodiments compile the description into a deployment configuration. In some embodiments, container-based clusters are generated for the edge system.

The use of the modeling language to model the manufacturing system allows the customer to generate customer-specific deployments for the edge system. This improves the generation of configurations for edge systems because each manufacturing system for different customers may be different. The modeling language allows the software provider receive a model from different customers and generate configurations for different manufacturing systems. The edge system is different from the remote computing system and a new modeling language specific to the edge system improves the configuration of specific layouts of manufacturing systems.

System Overview

FIG. 1 depicts a simplified system 100 for configuring and managing edge systems according to some embodiments. System 100 includes a server system 102 and a manufacturing system 104. Manufacturing system 104 may be associated with a customer and includes machines that are computing devices. Although one manufacturing system is described, multiple manufacturing systems 104 may be configured and managed. For example, different manufacturing system 104 include different types of machines that may be configured in different layouts with different software requirements. Also, different customers may be associated with different manufacturing systems. In some examples, a shop floor of a factory may be automated to manufacture cars using different machines, but some embodiments may be used to model other manufacturing systems.

A software provider includes server system 102, which can be used to automatically configure an edge system 114 and a remote computing environment 116. Server system 102 provides a modeling language that can be used by the customer to configure edge system 114 with a configuration that is specific to manufacturing system 104. The modeling language includes features that a specific to modeling manufacturing system 104. For example, a customer can use the modeling language to model the layout of machines in manufacturing system 104, which may include the type of machines being operated, the positioning of the machines on a shop floor, and software being executed by the machines. The shop floor may be where the machines are physically located to perform manufacturing of a product.

Edge system 114 may include computing systems that are situated on the edge of manufacturing system 104. The edge refers to computing systems that may be located on premises with manufacturing system 104. For example, edge system 114 may communicate with machines operating in manufacturing system 104 through a local area network (LAN).

Remote computing environment 116 may be a remote computing system that may perform operations remotely from manufacturing system 104. Edge system 114 may communicate with remote computing environment 116 via a wide area network (WAN). In some embodiments, edge system 114 may orchestrate operations in real-time with manufacturing system 104. The term real-time may be when edge system 114 may respond to a request from manufacturing system before communicating with remote computing environment 116. Also, edge system 114 may communicate with remote computing environment 116 to perform operations in non-real-time. For example, remote computing environment 116 may store data for manufacturing system 104, and analyze that data. Upon analysis, remote computing environment 116 may provide recommendations to edge system 114 to orchestrate the operation of manufacturing system 104. Additionally, for requests from manufacturing system 104 that do not require real-time responses, edge system 114 may send the request to remote computing environment 116, which then analyzes the request and provides a response back to edge system 114.

Server system 102 provides a modeling language that a customer can use to generate a specification of manufacturing system 104. Then, server system 102 can automatically generate a configuration for edge system 114.

In operation, server system 102 includes storage for a software provider's registry 106 that includes the software systems, such as applications, offered by a software provider. The software systems are ones that can be deployed to edge system 114 and/or remote computing environment 116. A layout specification manager 108 receives a specification from a user using the modeling language. The specification may specify the machines in manufacturing system 104, the required software to be installed on the machines, and also specify other requirements, such as service level agreements (SLAs), machine requirements and compatibility (e.g., the versions and software dependencies between different software applications on the machines), allowed maintenance periods, orchestration requirements (e.g., node selection, deployment replication for load balancing, versioning, computer processing unit (CPU) and memory limits, port exposure and communication protocols, update strategies, persistent volumes, and health check configurations. For example, microservices may be provided by specific software applications, but the microservices may include dependencies, such as one software application version may depend upon another software application version. Additionally, the specification may also specify a hardware layout and the software requirement for the hardware. For example, the specification may indicate the layout of the machines and also the type of machines and the software the machines currently run. Also, the service level agreement modeling may contain information about the dependencies between deployed microservices between machines. Additionally, the model identifies critical working hours of each microservice to specify when it is crucial that the service stays in its running state without interruptions. This helps the software provider avoid interrupting the microservices, such as by initiating patches and updates to the software during critical times.

The modeling language may also be used to identify the software required by each machine in manufacturing system 104. For example, the specification may mention the minimum and the maximum versions of the software that are compatible with each machine. This information may also be used as a guide for the software provider to plan upcoming patches and updates to the versions. If there are incompatible updates and patches installed, the machines might stop functioning properly. For example, a software S1 may be dependent on a software S2 and a software S2 may be dependent on a software S3. If some of the software S2 calls may not work in the future, software S1 needs to be notified ahead of the change and given the alternative calls. The dependency of software S1 on software S2 may be highlighted in the specification to avoid microservices breaking down when changes happen. Another dependency is between machines in the deployed software. A machine M1 may be using a software S1 and a software S2 supporting a range of versions. Any version above the maximum version number or below the minimum version number may not be compatible with the machine. Therefore, when updates from the software are scheduled, the software provider should notify the customer of the upcoming changes to be able to support the newly upcoming update.

A configuration generation system 110 then processes the specification from layout specification manager 108. Configuration generation system 110 retrieves applicable software systems from software provider's registry 106, such as the software application specified in the specification. Then, configuration generation system 110 generates runnable scripts and configuration files that can be used in the deployment of the software at edge system 114 and remote computing environment 116. Configuration generation system 110 may select the specified software and also use the layout of manufacturing system 104 to generate the runnable scripts and configuration files. Software provider's registry 106 may include images that can be retrieved by configuration generation system 110 and used to generate the configuration. For example, a container image description file is an image of a container that can be modified based on the specification. A script is then generated to install the image of the container. In some examples, configuration generation system 110 may alter the images using with metadata specified in the specification from the company.

A deployment system 112 uses the generated scripts and configuration files to install software systems at edge system 114 and remote computing environment 116. For example, deployment system 112 may use the images that have been altered to install containers in computing devices executing at edge system 114 and also on machines in manufacturing system 104. Deployment system 112 can run the scripts, which then use the configuration files to generate the containers.

Deployment Flow

Figure 2:
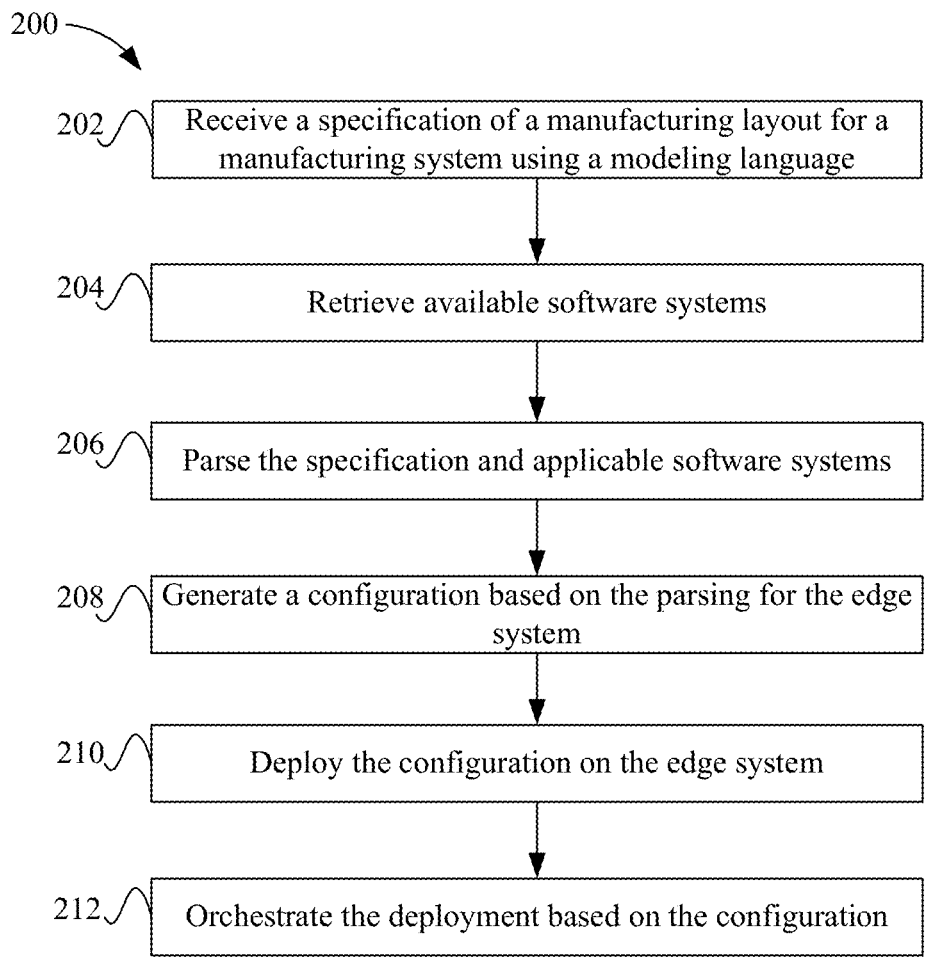
FIG. 2 depicts a simplified flowchart of a method for deploying configurations on the edge system according to some embodiments.

FIG. 2 depicts a simplified flowchart 200 of a method for deploying and operating a software configuration on edge system 114 according to some embodiments. At 202, server system 102 receives a description of a manufacturing layout for manufacturing system 104 using a modeling language.

FIG. 3A depicts an example of a specification 302 according to some embodiments. Specification 302 may be creating a plant in a factory as manufacturing system 104. The modeling language includes features that allow a user to specify manufacturing system specific aspects. For example, specification 302 creates different types of machines, such as automated guided vehicles (AGVs), programmable logic units (PLCs), and a control pod. For example, the plant may include multiple machines that are specified at 304. At 305, the specification adds a software requirement for the control pod. The software requirement in this case specifies the minimum and maximum version for the software of the control pod. Then, at 306, specification 302 adds the machines and the control pod to a plant. At 308, specification 302 creates a container client instance and initializes a cluster on the plant. The cluster is a group of machines that operate together. Also, at 307, specification 302 specifies the production hours of the factory, which can be used to determine when downtime is allowed.

Referring back to FIG. 2, at 204, server system 102 retrieves available software systems from software provider's registry 106. The software systems may be specified at 308 in specification 302, which identifies a type of container to use.

At 206, server system 102 parses the specification 302 to determine metadata that specifies a specific configuration for manufacturing system 104. The parsing may determine which machines are created, which requirements are specified, and which software configuration (e.g., containers) is created. The details are put into code generation templates.

Figure 3B:
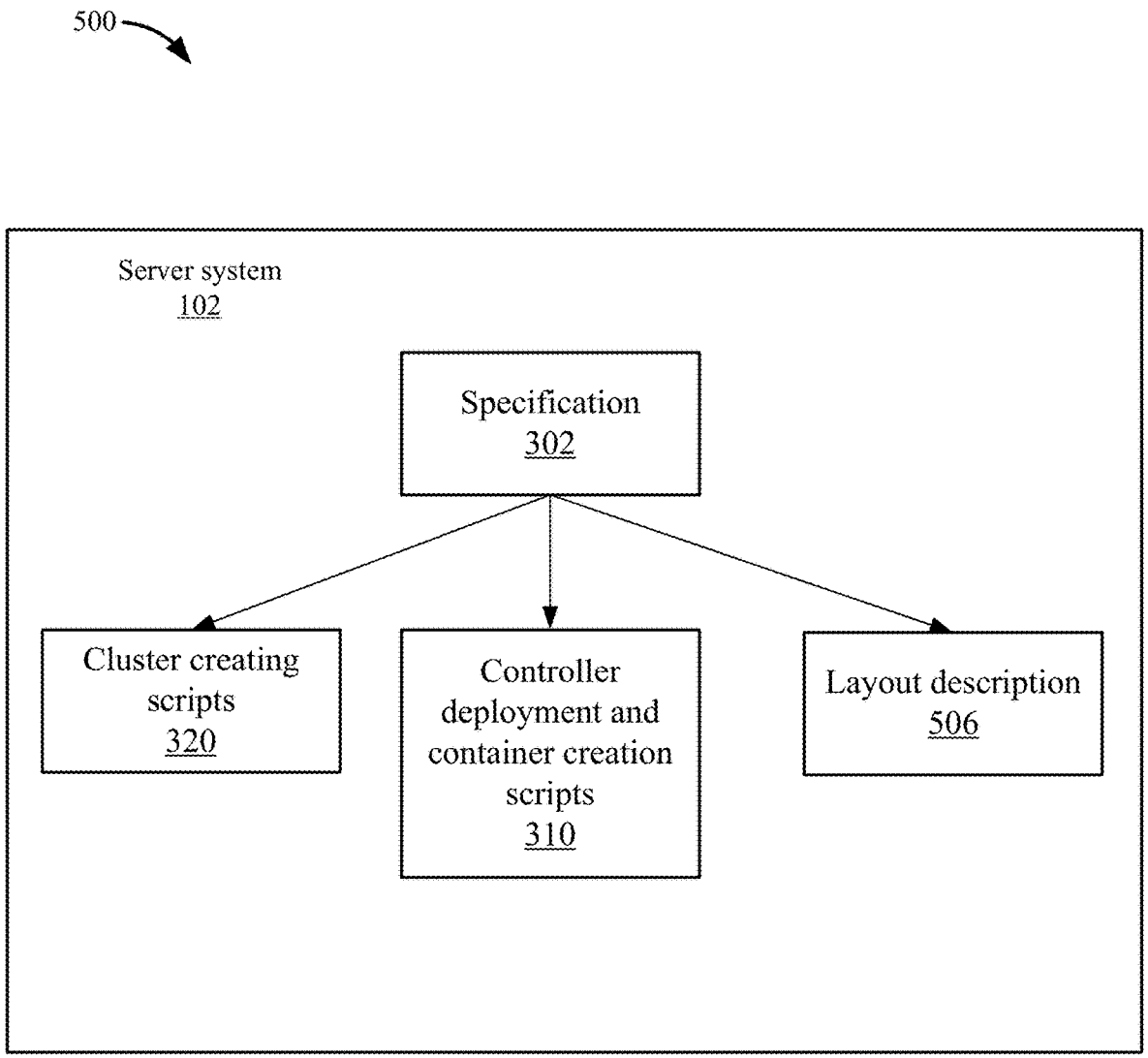
FIG. 3B shows an example of files that are created from the specification according to some embodiments.

At 208, server system 102 generates a configuration for edge system 114 based on the parsing. For example, server system 102 may generate scripts and configuration files for edge system 114. FIG. 3B shows an example of files that are created from a specification 302 according to some embodiments. Server system 102 may create cluster creation scripts 320, controller deployment and container creation scripts 310, and a layout description 506.

In FIG. 3A, at 309, a last line in specification 302 creates two files for container creation scripts 310. A first set of files may be a data structure for the configuration and a second file may be a script, such as a shell script. The first set of files contains the container creation files to be deployed. The script is used to create a new container using the configuration contained in the first file. FIG. 3C depicts an example of container creation files 310 according to some embodiments. In some embodiments, container creation files 310 are used to create containers in edge system 114 on machines specified in layout description 506. Containers provide a ready-to-execute software system that can run directly on machines with minimal installation steps. Containers provide environment agnostic software deployments and may be more lightweight in comparison to virtual machines. Lightweight software deployment solutions may be required for on-premise set-ups at edge system 114 due to the limited presence of computing resources on the edge as compared to in remote computing environment 116. Although containers are described, other software and hardware configurations may be used, such as virtual machines. Container creation file 310 specifies how to create a deployment. For example, at 312, the name of the deployment is specified. At 314, the number of replicas is specified. The replicas may be copies of the deployment and be used for load balancing. At 316, containers are specified for the deployment. For example, the image of "PCo" is specified. The image is retrieved from software provider's registry 106 and modified per the requirements of specification 302.

FIG. 3D depicts an example of cluster initialization scripts 320 according to some embodiments. A cluster initialization file 320-1 installs a script that is responsible for preparing machines to be part of the cluster specified in layout description 506. The script may be run on all machines that are going to be part of the cluster.

Cluster initialization file 320-2 provides a script that can be run on a master machine only for the cluster. The script initializes the cluster from that machine and welcomes any other machine to join the cluster. In some embodiments where the implementation would support different container orchestration frameworks and operating systems, the specification would clarify the tools used by manufacturing system 104. Then, cluster initialization files would be generated to work with the supported orchestration framework and operating system.

Referring back to FIG. 2, at 210, server system 102 deploys the configuration on edge system 114. For example, server system 102 may execute the scripts in configuration files 320 to initialize the clusters. The shop floor layout may be used to determine where software for the clusters should be installed on systems in manufacturing system 104.

At 212, server system 102 may orchestrate a deployment based on a configuration. For example, the configuration may have specified various requirements, such as when patches and updates can be performed. Other orchestration features include software deployment health checks through readiness and liveness probes, software replication for load balancing purposes, microservices connectivity between different machines, image version specification, computer processing unit (CPU) and memory limits, and port exposure and communication protocols.

Example System

Figure 4:
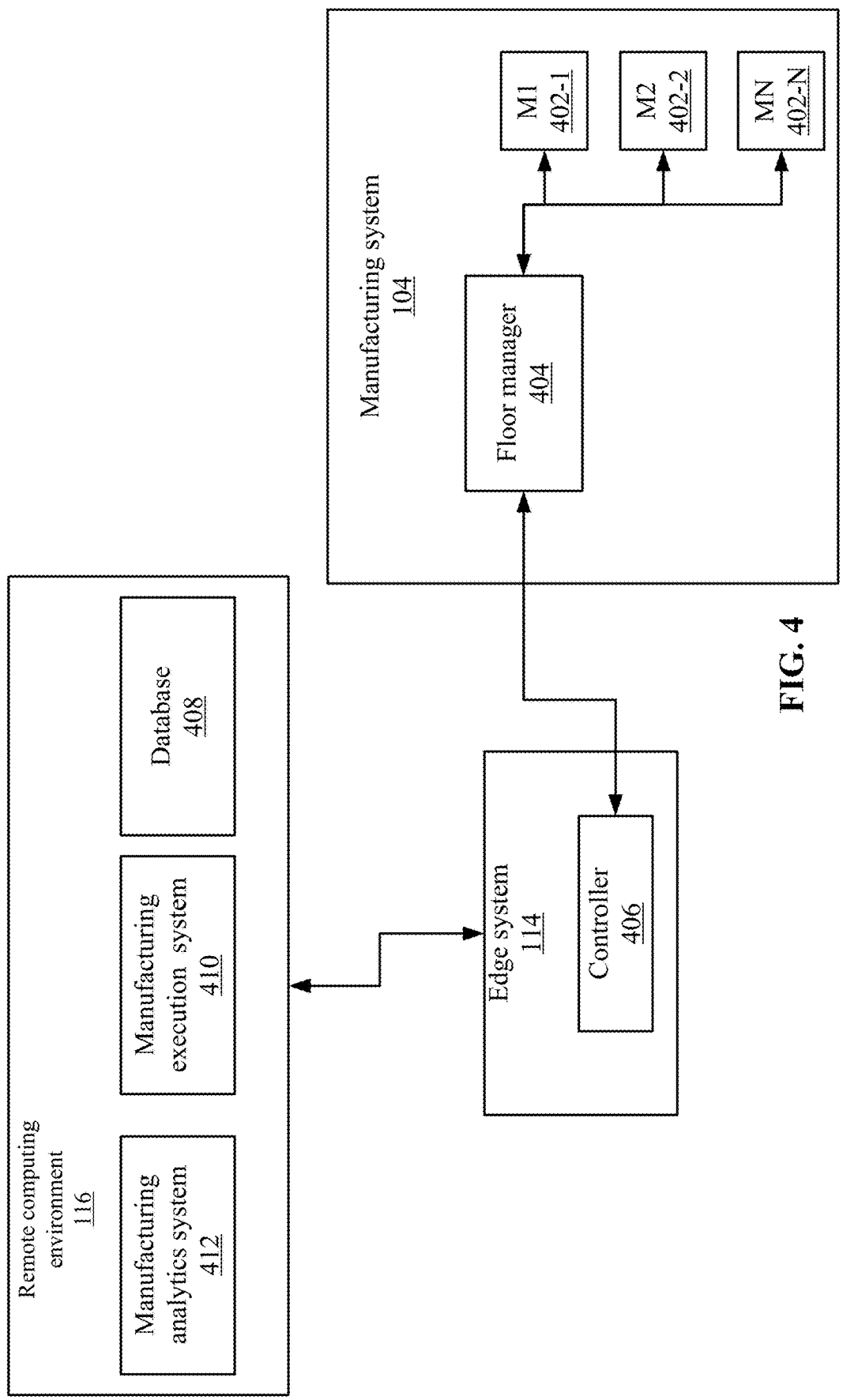
FIG. 4 depicts an example of the system according to some embodiments.

FIG. 4 depicts an example of system 100 according to some embodiments. Edge system 114 includes a controller 406 that can coordinate the operations of manufacturing system 104 and also the operations of remote computing environment 116. The factory may include a number of automated guided vehicles that are used to move a car between stations to be serviced, such as to have parts added to it. The factory has service stations where automated guided vehicles make stops at to proceed with the next step of manufacturing, such as attaching the car seats.

Manufacturing system 104 may include a cluster that includes a floor manager 404 and machines (M1 to MN) 402-1 to 402-N. Machines 402 may include automated guided vehicles or programmable service stations. For example, automated guided vehicles may stop at service stations for service. Also, floor manager 404 may be implemented using programmable logic units and coordinate the operation of automated guided vehicles. In manufacturing system 104, floor manager 404 coordinates the operations and controls the automated guided vehicles. Floor manager 404 may communicate with controller 406 in edge system 104 to send requests and have responses sent back in real-time.

In remote computing system 116, database 408 may store information for orchestrating the operations of manufacturing system 104. Manufacturing execution system 410 may manage the operations of manufacturing system 104. Additionally, manufacturing analytics system 412 may analyze the actions and make adjustments to the operations based on the analysis of the history of the operations.

At certain times, floor manager 404 may need to communicate with edge system 114. For example, in one scenario, when an automated guided vehicle arrives at a service station, floor manager 404 informs controller 406 of the event. Controller 406 can then respond in real-time to floor manager 414. Conventionally, floor manager 404 would perform two parallel requests to remote computing environment 116. For example, floor manager 404 would have sent a request to a manufacturing execution system 410 with information for the event. Manufacturing execution system 410 can then analyze the event and determine whether to return an error or not. For example, if the service station can service the automated guided vehicle, then no error may be returned. However, if the service station cannot service the automated guided vehicle, then an error may be returned.

Additionally, a manufacturing analytics system 412 may process the notification and analyze the patterns associated with the notification For example, analytics system 412 may analyze the software deployments to the edge systems and try to discern failure patterns or derive optimizations to optimize the software deployments. Any information from the analysis may be stored in database 408. However, for this operation, controller 406 can analyze the event and determine whether or not the service system can service the automated guided vehicle. Edge system 114 can process and return the response much faster than remote computing environment 116.

In other scenarios, an automated guided vehicle sends a request to move. Floor manager 404 receives the request and provides it to controller 406. Controller 406 can then respond in real-time. Conventionally, floor manager 404 notified manufacturing execution system 410. Manufacturing execution system 410 then determined the action to take and provide it back to controller 406. Additionally, manufacturing execution system 410 provided the action to manufacturing analytics system 412 for analysis and also store a record of the request in database 408. Instead of communicating with remote computing environment 116, floor manager 404 may communicate with controller 406. Controller 406 may then analyze the request and communicate with floor manager 404 to perform the movement without communicating with remote computing environment 116.

Conclusion

An edge system is different from a remote computing environment in that the edge system is dependent on machines being operated in manufacturing system 104. A modeling language that is specific to edge systems improves the operation of manufacturing system 104 by configuring the edge system to operate in between manufacturing system 104 and remote computing environment 116. By providing a modeling language that can model the layout of manufacturing system 104, the following advantages are provided. The model can be used to specify the specific layout of a customer's manufacturing system. Then, the configuration for deploying the edge system can be automatically generated. This is faster than manually configuring all the software systems on machines.

System

FIG. 5 illustrates hardware of a special purpose computing machine configured with server system 102 according to one embodiment. An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable storage mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information through the network interface 504 across a local network 520, an Intranet, or the Internet 530. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a specification of a manufacturing system that is generated using a modeling language, the modeling language allowing a layout of a set of machines in the manufacturing system to be specified;
   retrieving, by the computing device, available software systems from a software provider;
   analyzing, by the computing device, the specification to determine applicable software systems for the manufacturing system;
   generating, by the computing device, a configuration based on the analysis of the layout of the set of machines for the manufacturing system, the configuration specifying one or more instances of software systems to be installed on an edge system between the manufacturing system and a remote computing environment and the set of machines; and
   deploying, by the computing device, the one or more instances of the software systems on the edge system and the set of machines, wherein the edge system orchestrates operations on the set of machines operating in the manufacturing system in real-time, and wherein the edge system communicates with the remote computing environment for non-real time operations on the set of machines.

2. The method of claim 1, wherein generating the configuration comprises generating a creation file specifying requirements for creating the one or more instances of software systems.

3. The method of claim 2, wherein generating the configuration comprises generating one or more scripts configured to be executed to use the creation file to install the one or more instances of software systems on the set of machines.

4. The method of claim 3, wherein the one or more scripts initializes a cluster on one of the set of machines.

5. The method of claim 4, wherein the one or more scripts is configured to be run by the set of machines to join the cluster.

6. The method of claim 1, wherein an image of a controller configured to communicate with the remote computing environment and communicate with the set of machines is installed on the edge system.

7. The method of claim 1, wherein analyzing the description comprises:
   altering an image of a software system for installation on one of the set of machines specified in the specification.

8. The method of claim 1, wherein analyzing the description comprises:
   altering an image of a controller for installation on the edge system to configure the edge system to control the set of machines specified in the specification.

9. The method of claim 1, wherein orchestrating operations on the set of machines comprises:
   analyzing dependencies between two machines in the set of machines to determine whether to take an action that affects a software system installed on one of the two machines.

10. The method of claim 9, wherein the dependency comprises a version dependency between applications.

11. The method of claim 1, wherein orchestrating operations on the set of machines comprises:
    analyzing production times for a machine in the set of machines to determine whether to take an action that affects operation of the machine.

12. The method of claim 11, wherein the action comprises an update or patch to a software system installed on one of the set of machines.

13. The method of claim 1, further comprising:
receiving a request from a machine in the set of machines at the edge system; and
responding to the request in real-time at the edge system without communication with the remote computing environment.

14. The method of claim 1, further comprising:
receiving a request from a machine in the set of machines at the edge system; and
sending, by the edge system, information for the request to the remote computing environment for analysis, wherein the remote computing environment responds to the request.

15. A non-transitory computer-readable storage medium containing instructions, that when executed, control a computer system to be configured for:
receiving a specification of a manufacturing system that is generated using a modeling language, the modeling language allowing a layout of a set of machines in the manufacturing system to be specified;
retrieving available software systems from a software provider;
analyzing the specification to determine applicable software systems for the manufacturing system;
generating a configuration based on the analysis of the layout of the set of machines for the manufacturing system, the configuration specifying one or more instances of software systems to be installed on an edge system between the manufacturing system and a remote computing environment and the set of machines; and
deploying the one or more instances of the software systems on the edge system and the set of machines, wherein the edge system orchestrates operations on the set of machines operating in the manufacturing system in real-time, and wherein the edge system communicates with the remote computing environment for non-real time operations on the set of machines.

16. The non-transitory computer-readable storage medium of claim 15, wherein generating the configuration comprises generating a creation file specifying requirements for creating the one or more instances of software systems.

17. The non-transitory computer-readable storage medium of claim 15, wherein an image of a controller configured to communicate with the remote computing environment and communicate with the set of machines is installed on the edge system.

18. The non-transitory computer-readable storage medium of claim 15, wherein orchestrating operations on the set of machines comprises:
analyzing dependencies between two machines in the set of machines to determine whether to take an action that affects a software system installed on one of the two machines.

19. The non-transitory computer-readable storage medium of claim 15, wherein orchestrating operations on the set of machines comprises:
analyzing production times for a machine in the set of machines to determine whether to take an action that affects operation of the machine.

20. An apparatus comprising:
one or more computer processors; and
a non-transitory computer-readable storage medium comprising instructions, that when executed, control the one or more computer processors to be configured for:
receiving a specification of a manufacturing system that is generated using a modeling language, the modeling language allowing a layout of a set of machines in the manufacturing system to be specified;
retrieving available software systems from a software provider;
analyzing the specification to determine applicable software systems for the manufacturing system;
generating a configuration based on the analysis of the layout of the set of machines for the manufacturing system, the configuration specifying one or more instances of software systems to be installed on an edge system between the manufacturing system and a remote computing environment and the set of machines; and
deploying the one or more instances of the software systems on the edge system and the set of machines, wherein the edge system orchestrates operations on the set of machines operating in the manufacturing system in real-time, and wherein the edge system communicates with the remote computing environment for non-real time operations on the set of machines.

* * * * *